(12) United States Patent  
Hong et al.

(10) Patent No.: US 7,735,002 B2  
(45) Date of Patent: Jun. 8, 2010

(54) USER INTERFACE IN A MOBILE STATION

(75) Inventors: Seong-Ha Hong, Seoul (KR); Hyun-Mi Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1151 days.

(21) Appl. No.: 11/346,112

(22) Filed: Feb. 1, 2006

(65) Prior Publication Data

US 2006/0174208 A1   Aug. 3, 2006

(30) Foreign Application Priority Data

Feb. 1, 2005   (KR) ...................... 10-2005-0009256

(51) Int. Cl.  
*G06F 17/00* (2006.01)

(52) U.S. Cl. ........................ 715/234; 715/236; 715/738

(58) Field of Classification Search ......... 715/234–236, 715/746  
See application file for complete search history.

(56) References Cited

U.S. PATENT DOCUMENTS

| | | | | |
|---|---|---|---|---|
| 6,023,714 A * | 2/2000 | Hill et al. | ..................... | 715/235 |
| 6,507,857 B1 * | 1/2003 | Yalcinalp | ..................... | 715/235 |
| 7,028,257 B1 * | 4/2006 | Tischer | ..................... | 715/207 |
| 7,278,143 B2 * | 10/2007 | Muhlestein et al. | ......... | 719/310 |
| 7,308,649 B2 * | 12/2007 | Ehrich et al. | ................ | 715/234 |
| 7,366,976 B2 * | 4/2008 | Van Eaton et al. | .......... | 715/205 |
| 2002/0133516 A1 * | 9/2002 | Davis et al. | .................. | 707/513 |
| 2002/0138178 A1 | 9/2002 | Bergmann et al. | | |
| 2003/0028559 A1 | 2/2003 | Moreau | | |
| 2003/0149935 A1 * | 8/2003 | Takizawa et al. | ............ | 715/513 |
| 2005/0289524 A1 * | 12/2005 | McGinnes | .................. | 717/140 |

FOREIGN PATENT DOCUMENTS

| | | |
|---|---|---|
| CN | 1320335 | 10/2001 |
| JP | 2003084878 | 3/2003 |
| JP | 2004213082 | 7/2004 |
| KR | 10-2002-20039648 A | 5/2002 |
| KR | 2002-0073518 | 9/2002 |
| KR | 10-2003-0063559 A | 7/2003 |
| KR | 10-2004-0044657 A | 5/2004 |
| WO | WO 02/44937 A2 | 6/2002 |
| WO | WO 2004/023295 | 3/2004 |

* cited by examiner

*Primary Examiner*—Thu Huynh  
(74) *Attorney, Agent, or Firm*—Lee, Hong, Degerman, Kang & Waimey

(57) ABSTRACT

A method for processing a user interface in a mobile station comprises segregating application program data for constructing the user interface such that content data is separate from display style data, and storing the segregated application program data. The method also comprises constructing the user interface such that the content data corresponds to the display style data, and converting the format of the content data using the display style data. The method may further comprise displaying converted content data. The method may further comprise segregating application program data for constructing the user interface such that the soft key data is separate from the content data and the display style data. The display style data may comprise style sheet data.

19 Claims, 4 Drawing Sheets

Fig .2

```
<MenuList name= "mobile station management">
<Menu link="Action_phone_1">usage restriction setting</Menu>
<Menu link ="Action_phone _2">password change</Menu>
<Menu link ="Action_phone _3">reception refusal setting</Menu>
<Menu link ="Action_phone _4">reception method setting</Menu>
<Menu link ="Action_phone _5">local area setting</Menu>
<Menu link ="Action_phone _6">LCD setting</Menu>
<Menu link ="Action_phone _7">background lighting time</Menu>
<Menu link ="Action_phone _8">screen brightness control</Menu>
<Menu link ="Action_phone _9">call time list</Menu>
<MenuList>
```

```
<MenuList name= "sound volume bell sound">
<Menu link="Action_bell_1">bell/vibration conversion</Menu>
<Menu link="Action_bell_2">sound select</Menu>
<Menu link="Action_bell_3">bell sound size</Menu>
<Menu link="Action_bell_4">call connection tone</Menu>
<Menu link="Action_bell_5">service change tone</Menu>
<Menu link="Action_bell_6">one minute call tone </Menu>
<MenuList>
```

Fig .3

```
<xsl:stylesheet version = '1.0' xmlns:xsl='http://www.w3.org/1999/XSL/Transform'>
<xsl:template match= "MenuList">
    <tile><xsl:value-of select = "@name" /></title>
    <xsl:apply-templates />
</xsl:template>
<xsl:template match ="Menu">
    <li><xsl:value-of select = "." /></li>
<xsl:template>
</xsl:stylesheet>
```

Fig .4

```
<SoftKey name = "Edit">
<Right>
<Option link = "Action_edit_1">T9</Option>
<Option link = "Action_edit_2">ABC</Option>
<Option link = "Action_edit_3">abc</Option>
<Option link = "Action_edit_4">123</Option>
<Option link = "Action_edit_5">Symbol</Option>
</Right>
<Left> Select </Left>
</SoftKey>
```

USER INTERFACE IN A MOBILE STATION

CROSS-REFERENCE TO RELATED APPLICATIONS

Pursuant to 35 U.S.C. §119(a), this application claims the benefit of earlier filing date and right of priority to Korean Application No. 2005-0009256, filed on Feb. 1, 2005, the content of which are hereby incorporated by reference herein in their entirety.

FIELD OF THE INVENTION

The present invention relates generally to a mobile station and, more particularly, to a user interface in a mobile station.

BACKGROUND OF THE INVENTION

In general, a display screen for a mobile station is limited in the amount of content displayed. A related art display method uses a certain list style and displays soft keys (e.g., graphic icons) according to the listed items. A basic structure of a user interface (UI) in a mobile station displays content along with format information (e.g., style sheets), without separation. Due the lack of separation between content and style sheets, although an application (e.g., application program) has the same display style, a UI for the application program must be newly coded when a new application program is developed. Furthermore, when a style displayed on the screen of the mobile station needs to be changed, code pertaining to the UI for every application program must be searched and corrected.

SUMMARY OF THE INVENTION

Accordingly, the present invention is directed to a user interface in a mobile station that substantially obviates one or more problems due to limitations and disadvantages of the related art.

An object of the present invention is to provide processing in the mobile station such that one or more user interfaces (UI) are collectively processed for each application related to the mobile station by separate management of content, display style, and soft keys (e.g., graphic icons), using XML (Extensible Markup Language), for example.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for processing a user interface in a mobile station comprises segregating application program data for constructing the user interface such that content data is separate from display style data, and storing the segregated application program data. The method also comprises constructing the user interface such that the content data corresponds to the display style data, and converting the format of the content data using the display style data.

The method may further comprise displaying converted content data. The method may further comprise segregating application program data for constructing the user interface such that soft key data is separate from the content data and the display style data. The display style data may comprise style sheet data. The content data may be converted into extensible HTML (XHTML) format using the display style data. The method may further comprise selecting the soft key data if required by the content data to construct the user interface. The soft key data may be encoded to an extensible markup language (XML) format. The content data may be encoded to an XML format.

The content data may include an element to enumerate items to be displayed, and an attribute to define values of actions to be connected when the enumerated items are selected. The style sheet data may be encoded to extensible style sheet language (XSL) format. When XML encoded content data of a new application program is provided, a new application program for constructing the user interface may be added. The user interface may be constructed using the new application program, previously stored style sheet data, and soft key data. When new style sheet data is requested, XSL encoded style sheet data may be stored and used to provide a new style sheet of each application program, when the user interface is constructed. XML encoded soft key data may be provided to enable changes to be made to the soft key data when the user interface is constructed. The display style data may comprise style sheet data, and the method may further comprise analyzing the content data and the style sheet data using extensible markup language (XML) parsing. The style sheet data may include a table format and a list format.

In another embodiment, a mobile station adapted to process a user interface comprises a parser adapted to segregate application program data used to construct the user interface such that content data is separate from display style data, and a memory adapted to store the segregated application program data. The mobile station also comprises a controller adapted to construct the user interface such that the content data corresponds to the display style data and to convert the format of the content data using the display style data.

The mobile station may further comprise a display adapted to display converted content data. The parser may be further adapted to segregate application program data used to construct the user interface such that soft key data is separate from the content data and the display style data. The display style data may comprise style sheet data.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIG. 2 is a diagram illustrating exemplary XML encoding data of content used to form a UI related to an application of the mobile station, according to an embodiment of the present invention.

FIG. 3 is a diagram illustrating exemplary style sheet data of a list style with respect to content used to form the UI of the mobile station, according to an embodiment of the present invention.

FIG. 4 is a diagram illustrating exemplary XML encoding data of soft key information in an edit mode, according to an embodiment of the present invention.

DETAILED DESCRIPTION OF THE PREFERRED EMBODIMENTS

Figure 1:
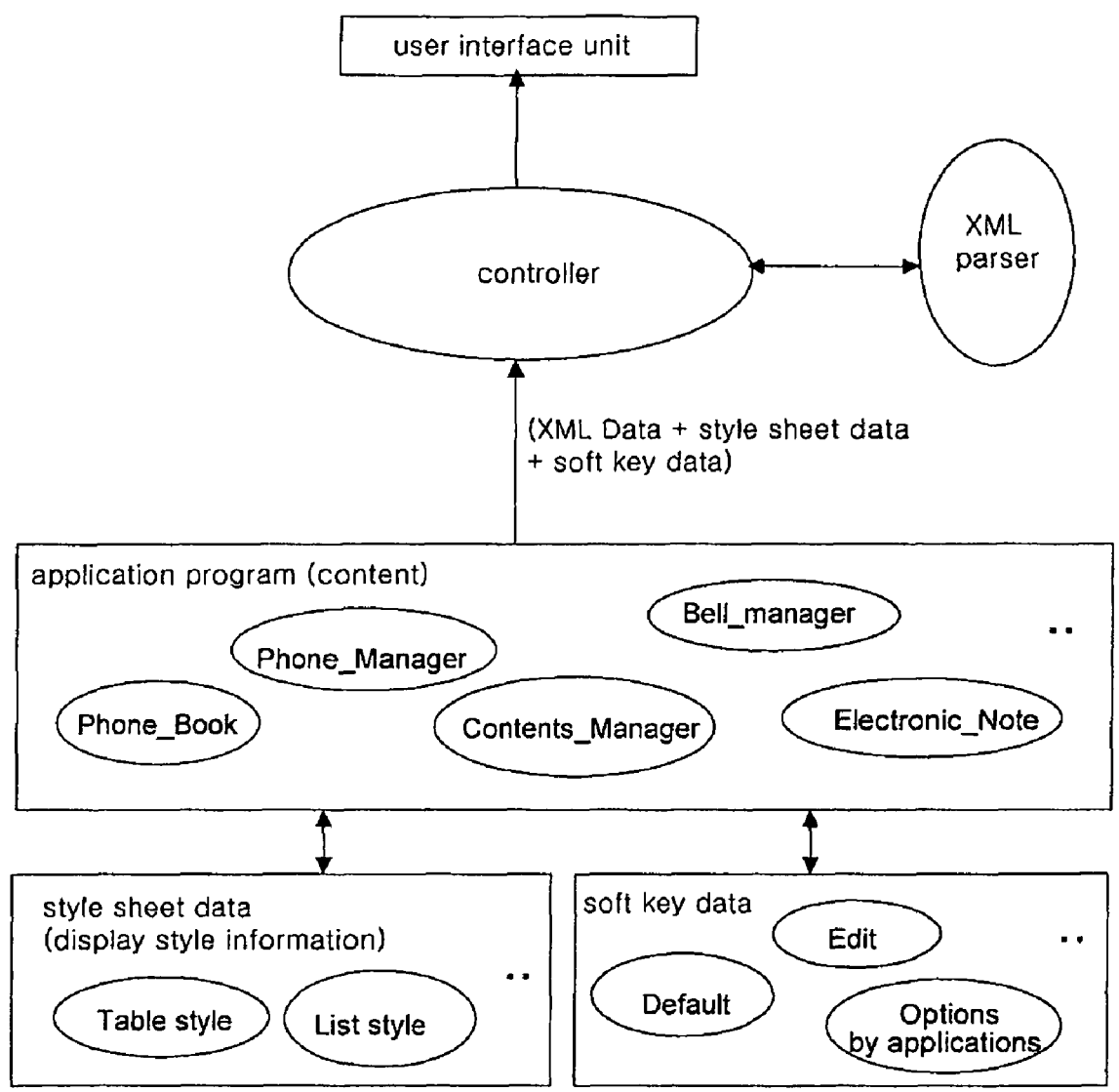
FIG. 1 is a diagram illustrating a method for collectively processing a user interface (UI) in a mobile station, according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The term 'mobile station' encompasses mobile phones, handsets, PDAs (personal digital assistants), and computers, as well as any other devices with wireless communication capabilities. A user interface in a mobile station is described below.

The present invention enables style information pertaining to display of content (content display style information) to be displayed on a display screen of a mobile station, separately from the content itself. Furthermore, information related to graphic icons (e.g., soft keys) may also be separated from the content. By independently displaying and/or managing the information related to the content, the display style, and the soft keys, a user interface may be collectively processed for each application program.

Content of an application program displayed on the display screen of the mobile station and a user interface function may be encoded into XML (Extensible Markup Language) data, for example. Content display style information may be defined using an XSL (extensible Style sheet Language), for example. Soft key information may be defined using an XML, for example.

XML is an international specification that defines document creation rules used for exchanging documents (e.g., information) through the Internet. The XML may be used to transmit, store and automatically process multimedia electronic files, including text, images, audio, and/or video among different types of systems without loss of information. In addition, the use of XML allows the content of a document and its expression type (e.g., display style) to be divided, such that the same content may be expressed in various ways. In separating a document into content and its expression type. The style sheet may handle the expression type, using XSL, for example. XSL is a style sheet language of the XML.

FIG. 1 is a diagram illustrating a method for collectively processing a user interface (UI) in a mobile station, according to an embodiment of the present invention.

Referring to FIG. 1, a program developer of the mobile station may divide a structure of a user interface of each application program into information related to the content, information related to a display style, and information related to a soft key. The program developer may then encode the information related to the content into XML data, the information related to the display style into XSL data of the XML, and the information related to the soft key to XML data.

FIG. 2 is a diagram illustrating exemplary XML encoding data of content used to form a UI related to an application of the mobile station, according to an embodiment of the present invention.

Referring to FIG. 2, exemplary XML encoding data related to a mobile phone application program (e.g., Phone_Manager) and a sound volume bell sound application program (e.g., Bell_Manager) is shown, from among various application programs shown in FIG. 1. For example, the content of application programs of 'mobile management' and 'sound volume bell sound' are described via an attribute of name in a menu list, and actions to be performed when each menu (e.g., mobile phone management menu and/or a sound volume bell sound menu) is selected are connected through a link attribute (e.g., menu link).

The style sheet data may be formed according to an XSL grammar, such as XSL grammar for supporting a table format and/or a list format.

FIG. 3 is a diagram illustrating exemplary style sheet data of a list style with respect to content used to form the UI of the mobile station, according to an embodiment of the present invention. FIG. 4 is a diagram illustrating exemplary XML encoding data of soft key information in an edit mode, according to an embodiment of the present invention.

Referring to FIGS. 3-4, the XML data of the encoded content, the XSL data of the display style information and the XML data of the soft key information are stored in a memory. An XML parser for parsing the encoded XML data and XSL data may also be stored in memory. In operation of the mobile station, when a specific key is inputted by the user, a controller of the mobile station may output the content of an application program to generate (e.g., form) a user interface in response to the inputted key. That is, the controller fetches XML data of the corresponding content and selects desired display style information from among previously configured display style information (e.g., style sheet data). If the fetched content requires information about the soft key, the controller also selects the XML data of the corresponding soft key. The controller then parses the content XML data, the display style information and the soft key XML data through the XML parser, transforms the content XML data into an XHTML (extensible HTML) format, or well-formed HTML format, for example, using display style information that has been analyzed by means of parsing. The controller then displays the transformed XHTML content and the parsed soft key information through a user interface unit (e.g., shown on the display screen) for the user's viewing.

For example, when a menu key is inputted through the user interface unit by the user, the controller fetches content elements of the menu application program corresponding to the menu key, for example, elements described by a name attribute of the menu list e.g., a phone book (e.g., phone_book), a mobile phone management (e.g., phone_management), a sound volume bell sound (e.g., bell_manager), content management (e.g., content_manager), and/or electronic notes (e.g., electronic_note) from the memory. The controller then selects liststyle data of the fetched content elements, and parses the fetched XML content data and the selected XSL liststyle data through the XML parser. The controller then transforms the parsed XML content data into the XHTML format according to the parsed XSL liststyle data and forms a user interface with the phone book, the mobile phone management, the sound volume bell sound, the content management and the electronic note menu in the list style.

When the sound volume bell sound is selected by the user, for example, the controller of the mobile station selects the XML data defined as a link attribute in the sound volume bell sound menu and then selects list style information, e.g., style sheet data of the selected XML data. If the selected XML data requests soft key information, the controller selects corresponding soft key information. The controller then XML-parses the selected XML data, the list style information and the soft key information and transforms the items into XHTML forms to construct a user interface. Then, referring to FIG. 2, a bell/vibration conversion, sound selection, a volume of the bell sound, a call connection tone, a service change tone and/or one minute call tone are displayed in a list form.

In one embodiment, a method for processing a user interface in a mobile station comprises segregating application program data for constructing the user interface such that content data is separate from display style data, and storing the segregated application program data. The method also comprises constructing the user interface such that the content data corresponds to the display style data, and converting the format of the content data using the display style data.

The method may further comprise displaying converted content data. The method may further comprise segregating application program data for constructing the user interface such that soft key data is separate from the content data and the display style data. The display style data may comprise style sheet data. The content data may be converted into extensible HTML (XHTML) format using the display style data. The method may further comprise selecting the soft key data if required by the content data to construct the user interface. The soft key data may be encoded to an extensible markup language (XML) format. The content data may be encoded to an XML format.

The content data may include an element to enumerate items to be displayed, and an attribute to define values of actions to be connected when the enumerated items are selected. The style sheet data may be encoded to extensible style sheet language (XSL) format. When XML encoded content data of a new application program is provided, a new application program for constructing the user interface may be added. The user interface may be constructed using the new application program, previously stored style sheet data, and soft key data. When new style sheet data is requested, XSL encoded style sheet data may be stored and used to provide a new style sheet of each application program, when the user interface is constructed. XML encoded soft key data may be provided to enable changes to be made to the soft key data when the user interface is constructed. The display style data may comprise style sheet data, and the method may further comprise analyzing the content data and the style sheet data using extensible markup language (XML) parsing. The style sheet data may include a table format and a list format.

In another embodiment, a mobile station adapted to process a user interface comprises a parser adapted to segregate application program data used to construct the user interface such that content data is separate from display style data, and a memory adapted to store the segregated application program data. The mobile station also comprises a controller adapted to construct the user interface such that the content data corresponds to the display style data and to convert the format of the content data using the display style data.

The mobile station may further comprise a display adapted to display converted content data. The parser may be further adapted to segregate application program data used to construct the user interface such that soft key data is separate from the content data and the display style data. The display style data may comprise style sheet data.

Accordingly, in the embodiments of the present invention, the mobile station separates and manages the application program of the user interface into content, style sheet data of content, and soft key information. Therefore, once the XML encoding data with respect to content of an application program to be added is provided by a developer, the new application program may be constructed as a user interface by using the existing style sheet data and soft key information. Furthermore, when the style sheet data of content of an application program constituting a user interface is to be changed to a new style, the developer may provide XSL encoding data defining new style sheet data without having to search and correct style sheet coding data one by one for every application program. Therefore, the new style sheet data may be easily applied to each application program content. Additionally, when a new soft key is required, the user may only need to add the XML encoding data defining a new soft key into the memory, thereby constructing a user interface by using the new soft key.

Therefore, because information related to content of an application program constituting a user interface, a display style of content and a soft key are separately managed by applying the XML, a user interface of each application program of a mobile station may be collectively processed. Additionally, a display style of the content to be displayed for the user's viewing may be easily changed through an application program. Furthermore, in developing a user interface of various application programs, a user interface may be managed by reducing unnecessary coding and having a structure with high expansion flexibility.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for processing a user interface in a mobile station, the method comprising:

segregating each of at least one existing application program data for constructing the user interface into content data, display style data and soft key data;

storing the segregated at least one existing application program data;

searching the display style data corresponding to encoded content data of a new application program when the new application program is provided, wherein the display style data is searched from the at least one existing application program data;

constructing a new user interface by parsing the encoded content data of the new application program and the searched display style data; and converting the format of the content data of the new application program using the display style data, wherein the display style data corresponding to the encoded content data of the new application program is the same as the display style data of one of the at least one existing application program data.

2. The method of claim 1, further comprising:
displaying converted content data.

3. The method of claim 1, wherein the display style data comprises style sheet data.

4. The method of claim 3, wherein the style sheet data is encoded to extensible style sheet language (XSL) format.

5. The method of claim 4, wherein when new style sheet data is requested, XSL encoded style sheet data is stored and used to provide a new style sheet of each of the at least one existing application program data, when the user interface is constructed.

6. The method of claim 3, wherein the display style data comprises style sheet data, further comprising:

analyzing the content data and the style sheet data using extensible markup language (XML) parsing.

7. The method of claim 6, wherein the style sheet data includes a table format and a list format.

8. The method of claim 1, wherein the content data is converted into extensible HTML (XHTML) format using the display style data.

9. The method of claim 1, further comprising:
selecting the soft key data if required by the content data to construct the user interface.

10. The method of claim 9, wherein the soft key data is encoded to an extensible markup language (XML) format.

11. The method of claim 10, wherein XML encoded soft key data is provided to enable changes to be made to the soft key data when the user interface is constructed.

12. The method of claim 1, wherein the content data is encoded to an XML format.

13. The method of claim 1, wherein the encoded content data of the new application program includes an element to enumerate items to be displayed, and an attribute to define values of actions to be connected when the enumerated items are selected.

14. The method of claim 1, wherein the user interface is constructed using the new application program, previously stored style sheet data, and soft key data.

15. A mobile station adapted to process a user interface, the mobile station comprising:
a parser adapted to segregate each at least one existing application program data for constructing the user interface into content data, display style data and soft key data;
a memory adapted to store the segregated at least one existing application program data; and
a controller adapted to construct the user interface by parsing the content data and the display style data and to convert the format of the content data using the display style data,
wherein the controller is adapted to construct a new user interface by parsing the encoded content data and previously stored display style data when encoded content data of a new application program is provided, and
wherein the display style data corresponding to the encoded content data of the new application is the same as the display style data of one of the at least one existing application program data.

16. The mobile station of claim 15, further comprising:
a display adapted to display converted content data.

17. The mobile station of claim 15, wherein:
the parser is further adapted to segregate the at least one existing application program data used to construct the user interface such that soft key data is separate from the content data and the display style data.

18. The mobile station of claim 15, wherein the display style data comprises style sheet data.

19. The mobile station of claim 15, wherein the controller is further configured to change the display style data of the constructed user interface to the new encoded display style data when new encoded display style data are provided.

* * * * *